UNITED STATES PATENT OFFICE.

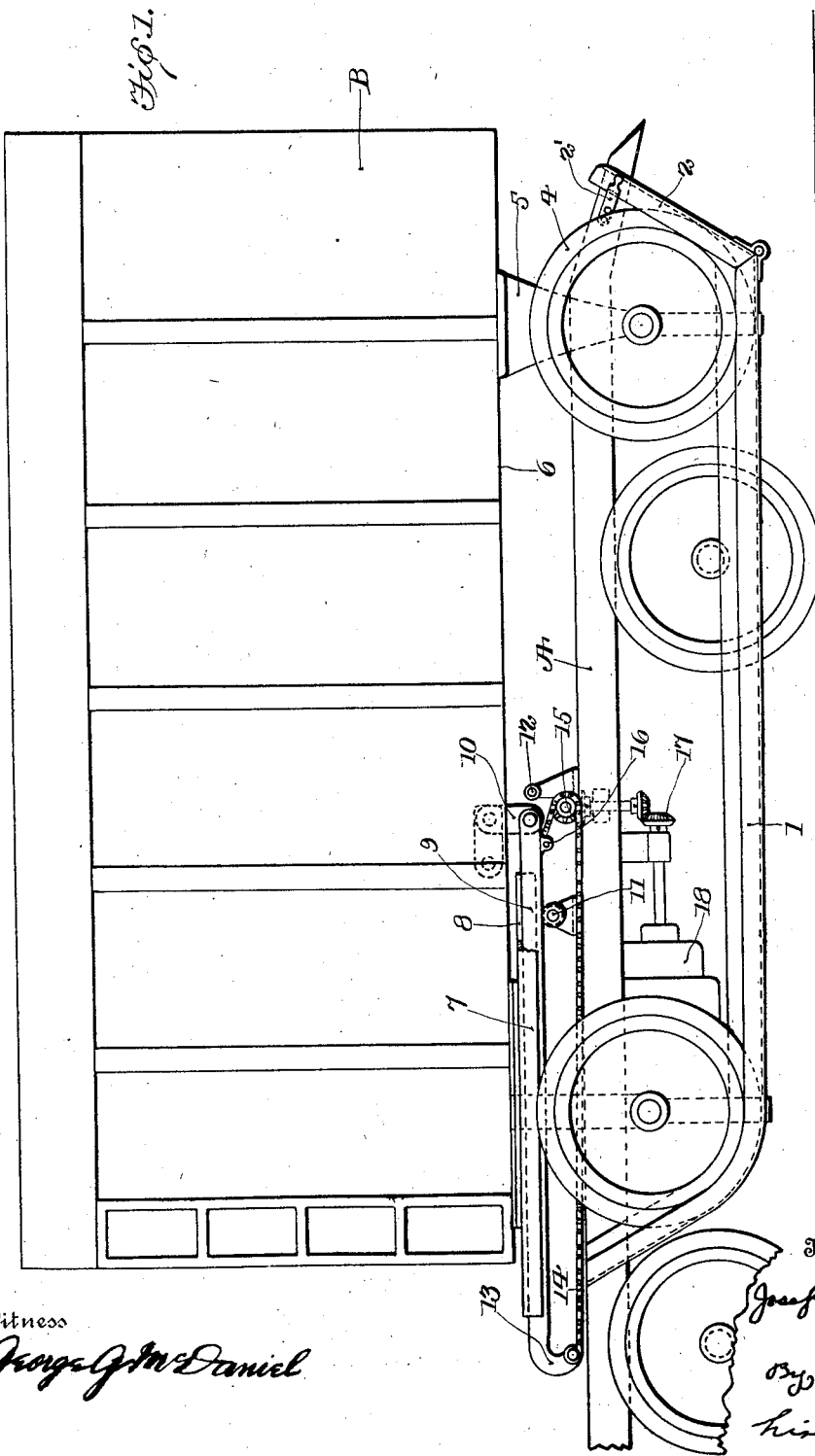

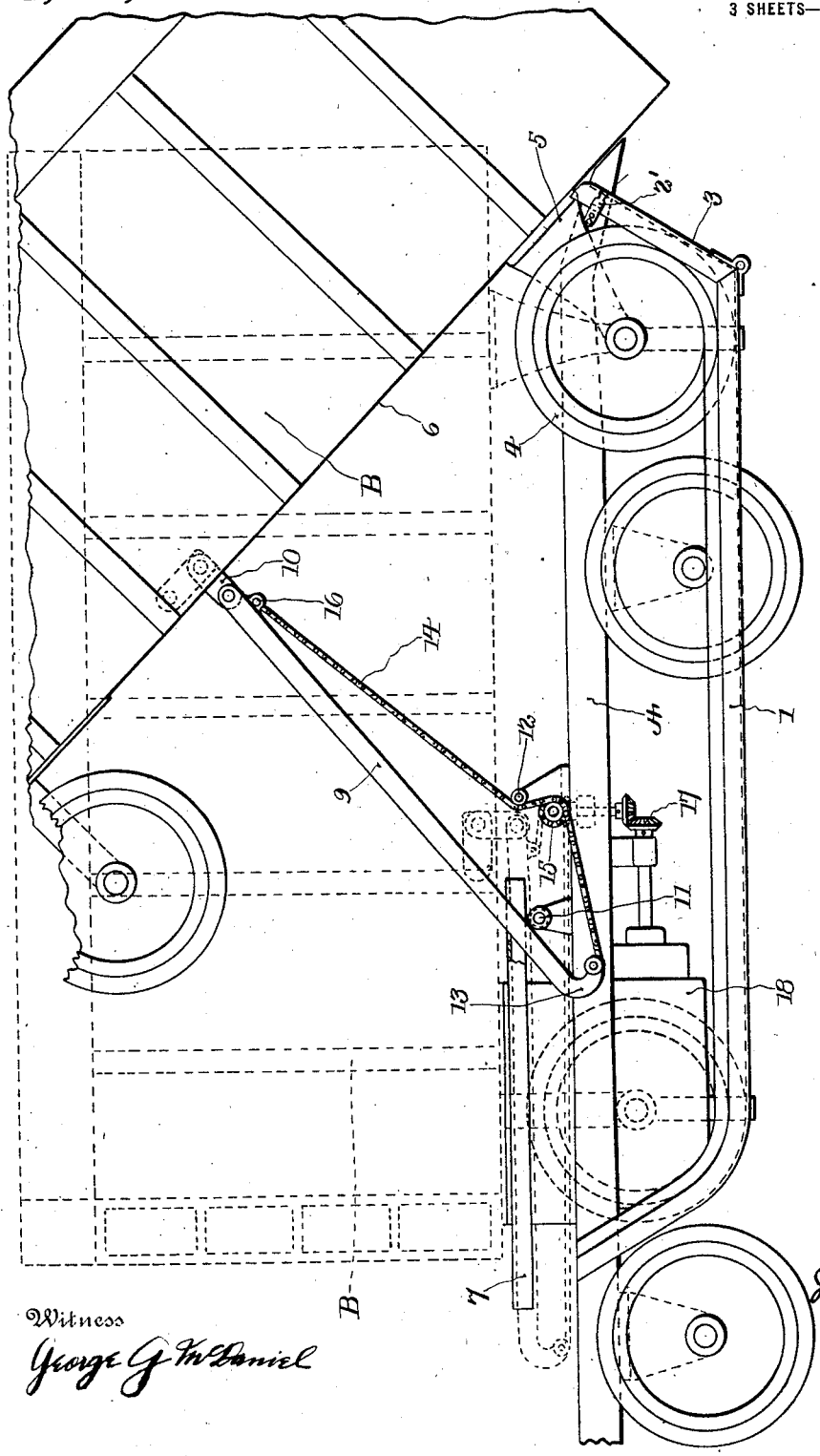

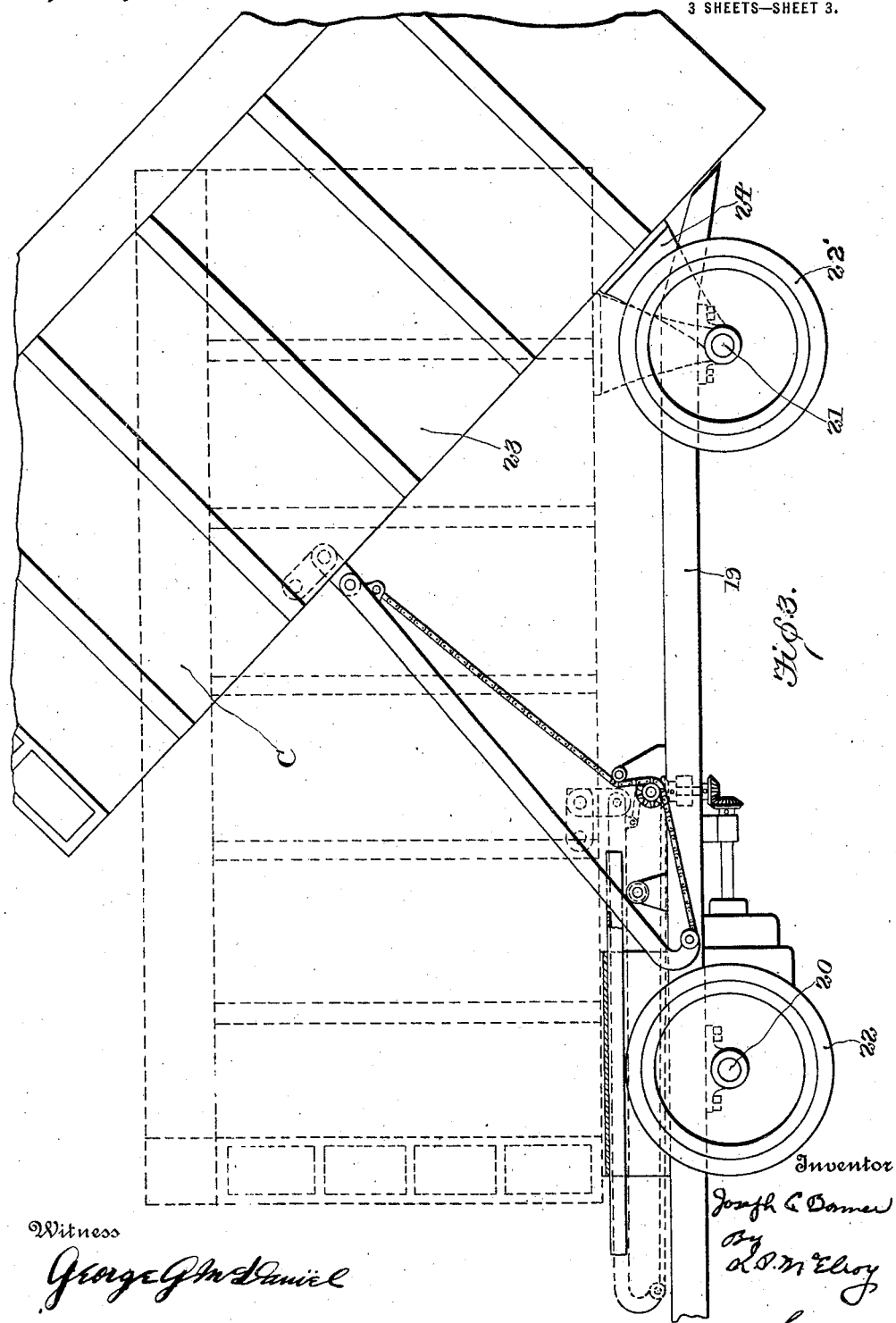

JOSEPH C. BONNER, OF TOLEDO, OHIO.

DUMPING MECHANISM.

1,333,289. Specification of Letters Patent. Patented Mar. 9, 1920.

Application filed April 28, 1917. Serial No. 165,141.

*To all whom it may concern:*

Be it known that I, JOSEPH C. BONNER, a citizen of the United States, residing at Toledo, in the county of Lucas and State of Ohio, have invented certain new and useful Improvements in Dumping Mechanism, of which the following is a specification.

This invention relates to dumping mechanisms and it comprises the combination with a vehicle having a pivoted body, of dumping mechanism consisting of a beam or lever carried by the truck and secured to the body of the vehicle, means for actuating the beam or lever and means for guiding said lever when actuated to cause it to tilt the body of the vehicle; all as more fully hereinafter set forth and as claimed.

This invention is capable of use on any type of dumping vehicle, and I will describe it with reference to its use in connection with the vehicle construction shown in my pending application Serial No. 186,983, filed August 18, 1917, and also as applied to any ordinary dumping vehicle. In the application referred to, I have shown an auto-truck carrying runners or tracks upon each side, adapted to receive the lower treads of the wheels of a road wagon or other vehicle, with the body of the road wagon straddling the body of the truck, for the purpose of transporting said wagon from place to place. Frequently the contents of the carried vehicle are of such nature that they may be unloaded by dumping the vehicle, similarly to an ordinary dump cart. For this purpose I employ the invention disclosed in this application.

In this specific embodiment I utilize the rear axle as a pivot when dumping, the rear wheels remaining stationary, allowing the entire body to assume an inclined position. The dumping mechanism can be easily applied to any ordinary vehicle by pivotally mounting the body of the same upon the truck.

In the present apparatus, I provide a dumping lever carried by the wheel truck and adapted to be connected to the body of the vehicle, means for operating the lever, and means for guiding the dumping lever when actuated to cause the free end of the wagon body to be elevated, thereby inclining it.

In the accompanying drawings I have shown more or less diagrammatically several advantageous embodiments of this invention.

In this showing:

Figure 1 is a side elevation showing the carried vehicle in position upon the carrying vehicle, and showing the dumping mechanism connected thereto;

Fig. 2 is a fragmentary view in elevation showing the carried vehicle in dumping position and showing the position of the dumping mechanism; and Fig. 3 is a similar view showing the mechanism applied to any ordinary dumping vehicle.

In the embodiment shown in Figs. 1 and 2, the motor truck or carrying vehicle is designated as a whole by A and the road wagon or carried vehicle is indicated by B. The motor truck is provided with tracks 1 arranged upon each side and secured to the frame, suitably spaced from the body at the proper distance to receive the wheels of the road wagon. The tracks are provided with hinged ends 2 which can be lowered to form inclined planes permitting the road wagon to be run into position upon the tracks. When the wagon is in position the pivoted ends are secured in the position shown in full lines in the drawings and means, such as latches 2' or the like, are provided for locking the pivoted ends in this position whereby the rear wheels are securely held, allowing the body of the road wagon to swing about the rear axle as a pivot. The wheels 4 of the road wagon are mounted upon depending brackets 5 so as to allow sufficient clearance space below the bottom 6 of the wagon, permitting the wagon to straddle the motor truck.

The motor truck is provided with a channel bar 7, one end of which is bifurcated as at 8, the channel bar serving as a guide for the lever 9 which is secured by bracket 10, to the bottom of the wagon when the wagon has been positioned upon the truck. A guide roller 11 is positioned below the channel bar and beyond the bifurcated end of the same, and a second guide roller 12 is arranged beyond the end of the channel bar and above the horizontal plane of the first guide roller. When in normal position (see Fig. 1) the lever is positioned in the channel bar and rests upon the first mentioned guide roller with the end of the lever arranged in front of the second guide roller and below the horizontal plane of the same. The opposite end 13 of the lever extends downwardly and is provided with means for connecting it to a chain 14 which passes over a sprocket 15 and is secured at 16 near the opposite end of the lever. The sprocket is carried on a shaft driven through the provision of suitable gearing 17 from the engine 18 of the motor truck. Suitable operating means (not shown) are provided whereby the sprocket may be actuated.

In Fig. 3 of the drawings, I have shown an ordinary dump wagon C with the improved dumping mechanism applied thereto. In this embodiment the wheel truck or running gear 19 is supported by the front axle 20 and the rear axle 21 which carry wheels 22 and 22' respectively. The body 23 of the wagon carries depending brackets 24, having annular openings or sleeves surrounding the rear axles and being free to revolve to permit dumping of the wagon body. Suitable locking mechanism (not shown) may be employed to secure the wagon body in normal position. The dumping lever, operating means and guide means are carried by the running gear, one end of the dumping lever being secured to the wagon body.

The operation of this device is as follows:

Assuming the vehicle to be in normal position as shown in Fig. 1 the clutch or other operating means is thrown into engagement actuating the sprocket through the provision of the gearing shown, or any other suitable gearing, causing the chain to feed about the sprocket. The power supplied through the chain moves the lever rearwardly until the end of the lever rides over the second mentioned guide roller which causes the entire lever to assume an inclined position, being guided by the first mentioned guide roller and the bifurcated end of the guiding member or channel bar. The operation is continued until the lever and the tilting body of the road wagon have reached the proper inclination such as is shown in Fig. 2. To resume a normal position the sprocket wheel is actuated in a reverse direction by reversing the engine or through the medium of reverse gearing.

In the embodiment shown in Fig. 3, the operation is essentially the same. The running gear, which carries the front and rear wheels and the dumping mechanism, remains stationary, while the wagon body is swung or rotated about the rear axle 21 as a pivot. In normal position, the body 23 and the brackets 24 assume the position shown in dotted lines. If desired the brackets 24 may be constructed as part of the running gear and the wagon body hingedly or pivotally mounted on these brackets.

It may be advisable to employ two sets of levers and operating mechanism one arranged upon each side of the machine, but it is not absolutely necessary as the mechanism will operate when used singly.

Of course, this invention is susceptible of use with other types of dumping wagons than those shown, and I do not intend to limit the invention to these two forms. It is only necessary that the body of the vehicle be pivoted upon the truck to permit dumping. The invention may also be employed with other types of vehicles than those driven by motor, and the dumping mechanism operated by hand through the medium of a crank placed upon the shaft carrying the sprocket wheel. The particular type of gearing used to illustrate the connection between the sprocket shaft and the engine forms no part of the invention except in the combination and any suitable means may be employed.

What I claim is:—

1. In combination with a vehicle having a pivoted body, means for dumping said body, means for actuating said dumping means, a guide member in which said dumping means is positioned, a guide roller positioned beneath said guide member, and a second guide roller beyond the guide member, to cause the dumping means to tilt said body, when actuated.

2. The combination with a vehicle having a pivoted body, of a dumping lever connected thereto, a guide member for said dumping lever, a guide roller disposed below the guide member and bearing against one face of said dumping lever, a second guide roller positioned beyond the end of said dumping lever and above the horizontal plane of the first mentioned guide roller, and means connected to each end of the dumping lever for operating the same.

3. The combination with a vehicle having a pivoted body, of a dumping lever connected thereto, a channel bar in which said dumping lever is normally situated, the rear end of said channel bar being bifurcated, a guide roller disposed below the channel bar and bearing against one face of said dumping lever, a second guide roller positioned beyond the end of said dumping lever and above the horizontal plane of the first mentioned guide roller, and means connected to each end of the dumping lever for operating the same.

4. The combination with a vehicle having a pivoted body, of a dumping lever connected thereto, the forward end of said lever extending downwardly, a guide member for said dumping lever, a guide roller disposed below the guide member and bearing against one face of said dumping lever, a second guide roller positioned beyond the end of said dumping lever and above the first mentioned guide roller, and means connected to each end of the dumping lever for operating the same.

5. In a dumping mechanism, the combination of a carrying vehicle and a carried vehicle, the carrying vehicle having a substantially flat top and being provided with supporting means arranged below said top, the carried vehicle being arranged to straddle said carrying vehicle with its wheels resting upon said supporting means, dumping means arranged upon the carrying vehicle, and adapted to be connected to the carried vehicle, and means for operating said dumping means.

6. In a dumping mechanism, the combination of a carrying vehicle and a carried vehicle, the carrying vehicle having a substantially flat top and being provided with supporting means arranged below said top, the carried vehicle being arranged to straddle said carrying vehicle with its wheels resting upon said supporting means, means for securing the rear wheels of the carried vehicle against longitudinal movement, dumping means upon the carrying vehicle connected to said carried vehicle and adapted to tilt the body of the carried vehicle, the rear axle thereof serving as a pivot.

7. In a dumping mechanism, the combination of a carrying vehicle and a carried vehicle, the carrying vehicle having a substantially flat top and being provided with supporting means arranged below said top, the carried vehicle being arranged to straddle said carrying vehicle with its wheels resting upon said supporting means, a dumping lever mounted on the carrying vehicle and connected to said carried vehicle, guiding means for said dumping lever, and means for actuating said dumping means.

8. In a dumping mechanism the combination of a carrying vehicle and a carried vehicle, means for supporting the carried vehicle upon the carrying vehicle, a dumping lever mounted on the carrying vehicle and connected to said carried vehicle, a channel bar in which said dumping means is positioned, the end of said channel bar being bifurcated, additional means for guiding said dumping lever and coöperating with said bifurcated end of said channel bar to cause the dumping lever to assume an inclined position.

9. In a dumping mechanism the combination of a carrying vehicle and a carried vehicle, means for supporting the carried vehicle upon the carrying vehicle, a dumping lever mounted on the carrying vehicle and connected to said carried vehicle, a channel bar in which said dumping means is positioned, a guide roller beneath the channel bar, a second guide roller spaced from the end of said channel bar and above the first mentioned guide roller and means for actuating said lever.

10. In a dumping mechanism, a vehicle having a wheel truck, and having a body secured to said truck and movable in the arc of a circle, a dumping lever secured to the body and to the wheel truck guiding means to cause said dumping lever to move rearwardly in a horizontal plane for a predetermined distance when actuated, and a guide roller positioned beyond said guiding means to cause said dumping means to assume an inclined position when the rearward movement is continued.

11. A device as described in claim 10, said body having a rear axle about which it revolves.

12. A device as described in claim 11, said body being separable from the wheel truck.

13. A device as described in claim 10 in which said dumping lever is provided with a downwardly extended end.

14. In combination with a vehicle having a pivoted body, a dumping lever connected thereto, driving means connected to each end of said dumping lever, means for guiding said dumping lever when actuated to cause said dumping lever to move rearwardly in a horizontal plane for a predetermined distance and means to cause said dumping lever to assume an inclined position when the rearward movement is continued.

15. In a dumping mechanism a vehicle having a wheeled truck, and having a body secured to said truck and movable in the arc of a circle, a dumping lever arranged on the wheeled truck and pivotally secured to the body, operating means comprising a chain secured to each end of said dumping lever, and means for guiding said lever when actuated whereby said lever is caused to move rearwardly in a horizontal plane for a predetermined distance, and to assume an inclined position when the rearward movement is continued.

In testimony whereof, I affix my signature hereto.

JOSEPH C. BONNER.